April 3, 1951　　A. LAFFON Y SOTO ET AL　　2,547,271
MEANS FOR DIMINISHING BACKGROUND NOISE
Filed March 31, 1949
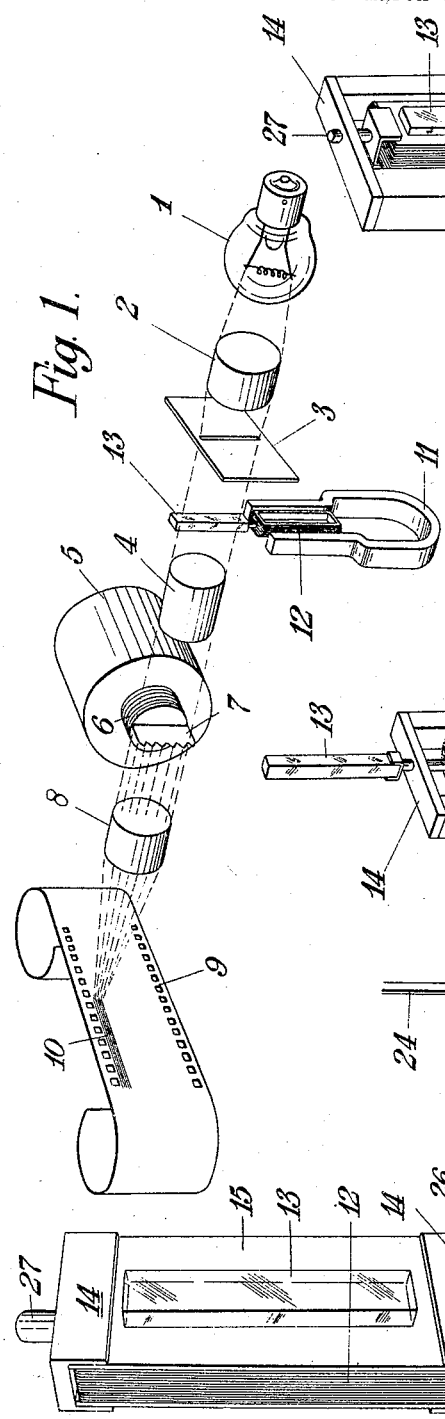

Patented Apr. 3, 1951

2,547,271

UNITED STATES PATENT OFFICE 2,547,271

MEANS FOR DIMINISHING BACKGROUND NOISE

Alberto Laffon y Soto and Ezequiel de Selgas y Marin, Madrid, Spain

Application March 31, 1949, Serial No. 84,688
In Spain April 20, 1948

7 Claims. (Cl. 179—100.3)

This invention relates to means for diminishing what is called "background noise" in the photo-electric recording of sound by means of an inductive electrodynamic oscillograph with an opaque light-modulating screen, wherein use is made for this purpose of a previously rectified fraction of the audio-frequency current.

Known systems for attenuating "background noise" in the photo-electric recording of sound, based on superposing upon the audio-frequency current another current previously rectified, which displaces the movable element of the oscillograph during the silences, cannot be applied to electro-dynamic inductive oscillographs provided with an opaque light-modulating screen, since in oscillographs of this type the moving coil receives the audio-frequency current by induction, and therefore lacks the terminals necessary for feeding it with continuous current.

Even those systems in which these currents do not circulate through the same winding, but the rectified and filtered current has a special winding of its own, are not applicable to induction oscillographs, since their essential characteristic is the lack of any terminal on their moving element.

The application to opaque-screen modulator oscillographs of systems of attenuation of background noise based upon the addition of auxiliary screens moved by small oscillographs, which reduce the luminous area during the silences, likewise proves delicate, owing to the necessity of locating these auxiliary screens in the same focal plane as the light-modulating screen, or else, to obviate this difficulty, complicating the optical system by the addition of an objective lens which produces a virtual image of the ray of light already modulated, so as to be able to locate at this point, remote from the modulating screen, the screens limiting the luminous area, which serve to attenuate the background noise, thus augmenting, by the addition of this lens to those already necessary for the recording system, the amount of light absorbed by the optical system.

According to this invention, in order to enable background noise to be diminished in the photo-electric recording of sound by means of an inductive electro-dynamic oscillograph with an opaque light-modulating screen, we provide a light-refracting galvanometer, comprising a transparent prism with parallel faces secured to the coil of a galvanometer, and rotatable with the coil about its longitudinal axis.

The invention is diagrammatically illustrated by way of example in the accompanying drawings, in which:

Figure 1 is a perspective view of the photo-electric recording apparatus;

Figure 2 is a perspective view on a larger scale showing how the refracting prism is mounted on the galvanometer coil;

Figure 3 is a similar view showing an alternative method of mounting the refracting prism in the galvanometer coil; and Figure 4 is a perspective view showing a preferred arrangement for checking the rotation of the galvanometer coil and prism.

Figure 1 represents the general arrangement for utilising this light-refracting galvanometer in recording sound by means of an inductive electro-dynamic oscillograph with an opaque modulator screen. An incandescent lamp 1 furnishes the necessary flux of light to a condenser 2, which illuminates a mechanical slot 3, beyond which is located the prism 13, secured to the moving coil 12 of the refraction galvanometer, which is located in a continuous magnetic field produced by a magnet 11. An objective lens 4 projects on to an opaque screen 7, which is rigidly secured to the moving coil 6 of the inductive oscillograph 5, a virtual image of the slot 3, whereupon an objective lens 8 in its turn projects the said virtual image, after modulation by the opaque screen 7, on to a photographic film 9, thus recording thereon a sound track 10.

The prism 12, situated between the mechanical slot 3 and the objective lens 4 that projects the image of the said slot on to the opaque screen 7 of the induction oscillograph 5, will not deflect the plane laminar beam of light (represented in Figure 1 by lines of dots), if its faces are normal to the said ray, but upon turning upon its longitudinal axis, moved by the galvanometer coil, will by refraction displace the beam of light parallel to itself, this displacement depending upon the angle of turning, upon the thickness of the prism, and upon the index of refraction of the substance of which the latter is made. In this way the beam of light that is incident upon the modulator screen 7 is deflected to such an extent that instead of falling upon the centre of the screen, the position that corresponds to the periods of maximum modulation of the light, it will fall near one of its edges during the silences or periods of weak modulation, thus diminishing the area of blackening on the sound negative, whereby a greater area of blackening will be obtained on the positive, thereby reducing the background noises produced during the silences or periods of feeble modulation by impurities in the photographic emulsion on the film and the breathing of the photo-electric cell of the pick-up, due to the intense illumination.

The refraction prism 13, rigidly secured to the coil 12 of the galvanometer in alignment with its axis of rotation, may be mounted externally thereto as illustrated in Figures 1 and 2, in which the prism 13 is shown mounted on the free end of a rotatable pivot of the coil 12; or else the prism may be lodged in the interior of the galvanometer coil, as shown in Figures 3 and 4, in which the prism 13 is accommodated in a window aperture provided in a magnetic core 15, upon the edges of which the coil 12 is wound. This prism also will be mounted in such a way that its longitudinal axis coincides with the axis of rotation of the coil.

The moving coil for the refraction oscillograph preferably consists of a core 15 of rectangular form and of small thickness, upon the edges of which are wound the turns of conducting wire forming the coil 12, which is located in a continuous magnetic field produced by the magnet 11, and is so supported on bearing members 14 that it can turn freely about its longitudinal axis. The bearings 14 must be of non-magnetic metal, in order to obviate the magnetic circuit between the poles of the magnet 11 being closed through the bearings 14. The central piece or core 15, upon which the coil is wound, and which is therefore rigid therewith, so that they rotate together, is of magnetic metal, fulfilling two distinct functions, namely: that of diminishing the air-gap, and therefore the reluctance of the magnetic circuit, between the pole shoes of the magnet 11, and that of maintaining a position of rest in the absence of any electric current through its winding 13, owing to the attraction that is exerted upon it by the lines of the magnetic field, thus obviating the use of control springs, the tension of which is liable to vary with use, thereby rendering necessary the readjustment thereof after a limited period of operation.

The angular position of rest of the movable frame of the galvanometer, and therefore of the prism, is perfectly definite and stable, since it will coincide with the position of stable equilibrium of a rotatable framework situated between the poles of a magnetic field.

When the coil that constitutes the movable frame is traversed by a rectified and filtered alternating current, a fresh magnetic field will be produced, which will be perpendicular to the permanent field already existing between the poles, the composition of these two fields producing a resultant magnetic field the strength and direction of which will depend upon the particular characteristics of the two component fields. The movable frame, with the prism, will therefore turn until it assumes a fresh angular position of stable equilibrium, defined in accordance with the direction of the said resultant field.

The coil is equipped with two stops which limit its angular displacement, but which, for the sake of greater clearness of the drawing, have not been represented in Figures 1, 2 and 3.

The actuating coil 12 of the refraction galvanometer is traversed by a fraction of the audio-frequency current, previously rectified and filtered, the strength of which is either directly or inversely proportional to that of the current that acts upon the light-modulating inductive oscillograph.

This refraction galvanometer operates in the following manner: As already stated, the current that feeds the actuating coil is either inversely or directly proportional to that which acts upon the light-modulating oscillograph. In the latter case, which is preferably adopted, the maximum current passes through the coil of the refraction galvanometer in the absence of modulation, this current diminishing as the modulated current increases, and becoming zero when the modulation reaches its maximum admissible. In the other case, in the absence of modulation, no current passes through the coil of the refraction galvanometer, but with modulation a current flows, which, when the modulated current increases, increases proportionally thereto.

In the case in which the currents are inversely proportional, the operation is as follows: Upon the coil 12 of the refraction galvanometer being traversed, during the silences, by the rectified and filtered current in its maximum strength, it is displaced by turning upon its axis until it reaches a predetermined angular position, overcoming the antagonistic force of the magnetic field which tends to retain it in its idle position, and carrying the prism round with it as it turns, so that the prism will deflect the plane laminar beam of light parallel to itself, until it causes it to fall upon that point of the modulator screen of the inductive oscillograph on which a predetermined minimum value of the blackening of the negative is obtained. Upon modulation occurring, and increasing in intensity, the rectified and filtered current that traverses the moving coil will proportionally diminish, and will then be insufficient to counteract the antagonistic force of the magnetism, so that the coil will commence to turn back towards its idle position, and consequently the prism will deflect the beam of light less, bringing it nearer to the centre of the opaque modulator screen of the inductive oscillograph. Upon the modulation attaining a pre-determined percentage the current traversing the coil of the refraction galvanometer will disappear, and the antagonistic force of the magnetism acting freely upon the coil will turn the movable frame and the prism back into their position of rest, that is, into a position normal to the beam of light, so that this beam will fall upon the central part of the modulator screen of the inductive oscillograph, permitting maximum modulation thereof.

In the less frequent case, of electing, for the purpose of acting upon the refraction galvanometer, a current directly proportional to that of the audio-frequency current that acts upon the inductive oscillograph, the operation will be the same except that the position of the prism will be so arranged that upon the coil turning, through the action of the current flowing through it, as far as the limit of its displacement, the parallel faces of the prism will become normal to the beam of light, which will therefore not be deflected, but will be incident upon the central part of the modulator screen of the inductive oscillograph, whereas when, in the absence of modulation, the coil is not carrying any current, the antagonistic action of the magnetism will carry the coil, and therefore the prism, to the position of maximum deflection of the beam of light.

The speeds of turning of the coil and its prism in each of its opposite movements, that is to say, what are called the "opening" and "closing" constants of "noiseless" operation are regulated in this refraction oscillograph in accordance with the time values universally recognised, acting upon the relative values of the turning moment produced by the current flowing through the movable frame and of the angular moment of inertia of the same, for the purpose of regulating the time of "opening"; and upon the discharge of a condenser through a resistance interposed in the electric circuit of the amplifier for the purpose of regulating the time of "closing."

It has been mentioned that the movable coil of the galvanometer is provided with two stops limiting its travel, which are not represented in Figures 1, 2 and 3, for the sake of greater clearness.

The utilisation of these galvanometers has demonstrated that the operation of these stops is more complex than would appear at first sight, since, in view of the angular velocity with which the movable frame turns in one of its movements, impelled by the force of magnetism, it is apt to strike violently against a stop, thus producing a rebound, after which the movable frame returns and comes into contact with the stop again. The prism rigid with the movable frame modulates the light audibly at this impact, the noise remaining impressed upon the film.

This defect on the one hand, and on the other hand the impossibility of printing films with a "noiseless" positive, or in other words with maximum blackening obtained directly upon the negative in the silences, has induced us to make a thorough study of this problem, as a result of which we have devised a system of spherical stops, displaceable simultaneously and rigid with a switch for reversing the electric current that flows through the movable frame. As in Figure 3, the movable frame of the galvanometer comprises the prism 13, enclosed in the magnetic core 15, which carries the winding 12, and which turns upon the pivots 27. Screwed normally to its axis of rotation, the core 15 carries a rod 26, the free end of which is in the form of a ball 19. This ball is situated between the hemispherically concave ends of two screws 17 and 18, which are screwed into the arms of a U-shaped bracket 20, and are so situated that when the galvanometer frame swings, the ball 19 engages in one of there hemispherical concavities. The bracket 20 is slidable in the longitudinal direction of the screws 17 and 18, or in other words, in a direction tangential to the arc through which the ball 19 moves.

For the purpose of this displacement the bracket 20 is provided with a screw-threaded bore, through which passes a screw-threaded spindle 22, which can rotate, without being displaced longitudinally, in a fixed support 21, which is rigid with the body of the galvanometer.

The angle of turning of the spindle 22 is mechanically limited to that necessary for sliding the bracket 20 the distance sufficient for displacing the screws 17 and 18 in such a way that when the movable element of the galvanometer is in its idle position, and the bracket 20 in one of its end positions, the spherical head 19 of the movable rod 26 lodges in the hemispherical concavity of the abutment screw 17, and by bringing the bracket 20 to its opposite end position, the said spherical head 19 will lodge in the hemispherical concavity of the other abutment screw 18. The spindle 22, in its rotation, actuates an electric switch for reversing the current that flows through the movable frame 15, in such a way that the direction of the said current will be opposite, in one of the end positions of the sliding bracket 20 to what it is in the other end position of the said bracket.

This reversing switch may be of any one of the known types, with contacts that are opened and closed either by means of eccentrics rigid with the spindle, or by means of a drum of insulating material provided with embattled contact strips 23 and brushes 24, mounted on one end of the spindle 22, as illustrated in Figure 4.

The operation of this device is as follows: To obtain a normal negative of sound, in which, during the silences, the blackening is a minimum, the abutment screws 17 and 18 will be so regulated that when the bracket 20 is in the corresponding end position, and the coil 12 of the galvanometer is not being traversed by the electric current, one of the abutment screws, namely the one for limiting the turning of the movable element of the galvanometer into its position for opening the "noiseless" operation, will have its concavity located in intimate contact with the ball 19 of the movable rod 26, and the opposite screw will come into contact with the said ball when the coil is traversed by the electric current and turns the movable frame until it reaches the position for closure of "noiseless" operation, or in other words the position of minimum blackening of the negative, one of the screws in this way acting as a closure stop and the other as an opening stop. In order to obtain horizontal coincidence of the ball 19 with the hemispherical concavities of the screws 17 and 18, the length of the rod 26 will be adjusted; and for its vertical coincidence, that of a tail-stock 25 supporting the lower pivot 27, which displaces vertically the entire movable system of the oscillograph. This vertical centering of the ball 19 with the hemispherical concavities of the screws 17 and 18 will be effected in such a way that the ball remains slightly eccentric in relation to the concavities, so that on the ball rubbing lightly against the edges of the concavity before lodging therein a braking effect will be produced which absorbs the shock, and obviates a rebound of the ball, such as would occur if the abutment faces were plane, thus obviating the serious disadvantage mentioned at the beginning of this specification.

In order to obtain a "noiseless" positive, that is, with a maximum of blackening during the silences, it will be sufficient to regulate the angle of turning of the spindle 22, which displaces the bracket 20 to its other end position, in such a way that when the movable element of the galvanometer is located in its position of rest, without its coil 12 being traversed by any current, the abutment screw that was previously limiting the travel of the said movable element for the closure of "noiseless" operation will now be in contact with the ball 19 to limit the opening, the other abutment screw remaining automatically in the requisite position to limit the travel at the closure of "noiseless" operation, seeing that the movable frame will turn in the opposite direction, owing to the reversal of the direction of the current flowing through it, effected by the reversing switch rigid with the spindle 22. In this way the "noiseless" operation obtained will have its maximum blackening during the silences, and will be able to be heard as a positive without background noise.

With this arrangement of stops the result is obtained not only that the abutments limiting travel do not produce the prejudicial modulation impressed upon the sound strip owing to the rebound of the movable element of the galvanometer on striking against them, but furthermore the result that by simply manipulating the spindle, impressions of sound with a "noiseless" negative, as normally utilised, can be obtained and also impressions with a "noiseless" positive, so that it is possible to hear a noiseless impression directly from a negative, without having to prepare a positive, which is very convenient when it is a question of realising impressions which have to serve for re-impressions or tests, and which do not require a positive to be obtained from the negative, with a consequent saving of photographic material, laboratory work, and time.

We claim:

1. In apparatus including an inductive electrodynamic oscillograph and an opaque light-modulating screen for the photo-electric recording of sound, means for minimizing "background noise," comprising: means for causing a laminar beam of light to fall upon the opaque light-modulating screen, a moving-coil galvanometer, including means for producing a continuous magnetic field, the moving coil being located in the said field, a transparent prism with parallel plane faces mounted on the said moving coil to turn therewith, the prism being interposed in the path of the said laminar beam of light before it reaches the light-modulating screen, means for rectifying a fraction of the audio-frequency current employed for recording, and means for feeding the said rectified fraction to the galvanometer coil.

2. A refracting galvanometer for use in minimizing "background noise" in the photo-electric recording of sound by means of an inductive electro-dynamic oscillograph and an opaque light-modulating screen, comprising: means for producing a continuous magnetic field, a moving galvanometer coil located in the said magnetic field, a transparent prism with parallel plane faces mounted on the said coil and turnable therewith, and means for feeding to the said coil a rectified fraction of the audio-frequency current employed for recording.

3. A refracting galvanometer for use in minimizing "background noise" in the photo-electric recording of sound as claimed in claim 2, further comprising stops for mechanically limiting the angular displacement of the moving coil and prism, the said stops being adapted to obviate any rebound of the moving coil and prism therefrom.

4. A refracting galvanometer for use in minimizing "background noise" in the photo-electric recording of sound as claimed in claim 2, further comprising: a fixed support rigid with the galvanometer, a bracket slidable along the said fixed support, stops carried by the said bracket for mechanically limiting the angular displacement of the moving coil and prism, and a reversing switch carried by the said bracket and actuated by the displacement thereof for reversing the electric current through the galvanometer coil.

5. A refracting galvanometer for use in minimizing "background noise" in the photo-electric recording of sound as claimed in claim 2, further comprising: a U-shaped bracket mounted on the stationary part of the galvanometer, two abutment screws, substantially in alinement with one another, adjustable one in each limb of the U-shaped bracket, the adjacent ends of the two screws being formed with substantially hemispherical recesses, a rod projecting laterally from the moving part of the galvanometer, and a substantially spherical knob at the free end of the rod adapted to engage alternatively in the said hemispherical recesses and to move from one to the other as the coil and the prism turn.

6. A refracting galvanometer for use in minimizing "background noise" in the photo-electric recording of sound as claimed in claim 2, further comprising: a U-shaped bracket mounted on the stationary part of the galvanometer, two abutment screws, substantially in alinement with one another, adjustable one in each limb of the U-shaped bracket, the adjacent ends of the two screws being formed with substantially hemispherical recesses, a rod projecting laterally from the moving part of the galvanometer, a substantially spherical knob at the free end of the rod adapted to engage alternatively in the said hemispherical recesses and to move from one to the other as the coil and the prism turn, and means for adjusting the U-shaped bracket in the longitudinal direction of the abutment screws.

7. A refracting galvanometer for use in minimizing "background noise" in the photo-electric recording of sound as claimed in claim 2, further comprising: a U-shaped bracket mounted on the stationary part of the galvanometer, two abutment screws, substantially in alinement with one another, adjustable one in each limb of the U-shaped bracket, the adjacent ends of the two screws being formed with substantially hemispherical recesses, a rod projecting laterally from the moving part of the galvanometer, a substantially spherical knob at the free end of the rod adapted to engage alternatively in the said hemispherical recesses and to move from one to the other as the coil and the prism turn, an internally screw-threaded bore extending through the U-shaped bracket parallel to the longitudinal direction of the abutment screws, a screw-threaded spindle engaging in the said bore, stationary bearings supporting the said spindle and restraining it from longitudinal displacement, means for rotating the said spindle and thereby displacing the U-shaped bracket within definite limits, and a reversing switch co-operating with the said spindle for reversing the electric current through the galvanometer coil.

ALBERTO LAFFON Y SOTO.
EZEQUIEL DE SELGAS Y MARIN.

REFERENCES CITED

The following references are of record in the file of this patent:

UNITED STATES PATENTS

| Number | Name | Date |
|---|---|---|
| 1,888,724 | Hanna | Nov. 22, 1932 |
| 2,209,664 | Runge | July 30, 1940 |
| 2,233,441 | Whittaker | Mar. 4, 1941 |
| 2,414,666 | Poulsen | Jan. 21, 1947 |